United States Patent
Lim et al.

(10) Patent No.: US 10,984,541 B2
(45) Date of Patent: Apr. 20, 2021

(54) 3D POINT CLOUD COMPRESSION SYSTEMS FOR DELIVERY AND ACCESS OF A SUBSET OF A COMPRESSED 3D POINT CLOUD

(71) Applicant: Samsung Electronics Co., Ltd., Suwon-si (KR)

(72) Inventors: Youngkwon Lim, Allen, TX (US); Imed Bouazizi, Frisco, TX (US); Eric Ho Ching Yip, Seoul (KR); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/379,675

(22) Filed: Apr. 9, 2019

(65) Prior Publication Data
US 2019/0318488 A1 Oct. 17, 2019

Related U.S. Application Data

(60) Provisional application No. 62/656,737, filed on Apr. 12, 2018, provisional application No. 62/656,694, filed on Apr. 12, 2018.

(51) Int. Cl.
*G06K 9/00* (2006.01)
*G06T 7/33* (2017.01)
(Continued)

(52) U.S. Cl.
CPC .......... *G06T 7/337* (2017.01); *G06K 9/00208* (2013.01); *G06T 7/38* (2017.01);
(Continued)

(58) Field of Classification Search
CPC .. G06T 7/337; G06T 7/38; G06T 7/50; G06T 7/40; G06T 9/00; G06T 9/001;
(Continued)

(56) References Cited

U.S. PATENT DOCUMENTS

2010/0239178 A1 9/2010 Osher et al.
2011/0202538 A1 8/2011 Salemann
(Continued)

FOREIGN PATENT DOCUMENTS

EP 3554083 A1 * 10/2019 ............. H04N 19/70

OTHER PUBLICATIONS

ISA/KR, International Search Report and Written Opinion of the International Searching Authority in connection with International Application No. PCT/KR2019/004422, dated Jul. 18, 2019, 7 pages.
(Continued)

*Primary Examiner* — Jose L Couso

(57) ABSTRACT

An encoding device, a decoding device and a method for point cloud encoding is provided. The method includes generating, for a 3D point cloud, frames corresponding to attributes of the 3D point cloud and an occupancy map. The method also includes encoding, the frames to generate one or more bitstreams. The one or more bitstreams include individual tracks and media content. The individual tracks include media tracks and a timed metadata track. The timed metadata track references the media tracks and the media tracks correspond respectively to the attributes. The method also includes generating a container including the one or more bitstreams transmitting the container.

20 Claims, 10 Drawing Sheets

(51) Int. Cl.
*H04N 19/137* (2014.01)
*H04N 19/182* (2014.01)
*H04N 19/172* (2014.01)
*G06T 7/38* (2017.01)

(52) U.S. Cl.
CPC ......... *H04N 19/137* (2014.11); *H04N 19/172* (2014.11); *H04N 19/182* (2014.11)

(58) Field of Classification Search
CPC ......... G06T 9/004; G06T 9/003; G06T 15/00; G06T 17/00; G06T 17/10; G06T 17/20; G06T 19/006; G06T 2207/10028; G06T 2207/20016; H04N 19/137; H04N 19/172; H04N 19/182; H04N 19/597; H04N 19/20; H04N 19/161; H04N 19/00; H04N 19/105; H04N 19/44; H04N 19/91; H04N 19/46; H04N 19/70; H04N 19/176; H04N 19/107; H04N 19/119; H04N 19/136; H04N 19/147; H04N 19/15; H04N 19/184; H04N 19/19; H04N 19/43; H04N 19/50; H04N 19/521; H04N 19/593; H04N 19/61; H04N 19/82; H04N 19/86; H04N 19/89; H04N 19/167; H04N 21/23412; H04N 21/44012; H04N 21/85406; H04N 21/8549; H04N 21/816; H04N 21/2343; H04N 21/4402; H04N 21/81; H04N 13/178; H04N 13/388; H04N 13/275; H04N 13/194; H04N 13/161; H04N 13/271; H04N 13/282; H04N 13/293; G06K 9/00208; G06K 9/00201; G06K 9/00214; H04L 65/607; H04L 65/80; H04L 65/601; H04L 65/605; H03M 7/3059; G06F 16/29; G06F 3/0346; G06F 3/011
See application file for complete search history.

(56) References Cited

U.S. PATENT DOCUMENTS

| | | | |
|---|---|---|---|
| 2016/0086353 A1 | 3/2016 | Lukac et al. | |
| 2017/0214943 A1 | 7/2017 | Cohen et al. | |
| 2017/0347120 A1* | 11/2017 | Chou | H04N 19/147 |
| 2019/0045276 A1* | 2/2019 | Ruhm | H04N 21/47202 |
| 2019/0139296 A1* | 5/2019 | Lakshman | G06T 15/08 |
| 2019/0158813 A1* | 5/2019 | Rowell | H04N 13/189 |
| 2019/0200046 A1* | 6/2019 | Lucas | H04N 19/124 |
| 2019/0327467 A1* | 10/2019 | Chou | H04N 19/176 |
| 2019/0371051 A1* | 12/2019 | Dore | G06T 7/50 |
| 2020/0153885 A1* | 5/2020 | Lee | H04N 13/194 |
| 2020/0154137 A1* | 5/2020 | Fleureau | H04N 19/172 |
| 2020/0202608 A1* | 6/2020 | Mekuria | G06T 7/40 |
| 2020/0252647 A1* | 8/2020 | Lasserre | G06T 9/00 |

OTHER PUBLICATIONS

Singer, "ISO Base Media File Format (aka MPEG File Format)", MPEG doc. # N11966, Mar. 2011, 8 pages.

* cited by examiner

US 10,984,541 B2

3D POINT CLOUD COMPRESSION SYSTEMS FOR DELIVERY AND ACCESS OF A SUBSET OF A COMPRESSED 3D POINT CLOUD

CROSS-REFERENCE TO RELATED APPLICATION AND CLAIM OF PRIORITY

This application claims priority under 35 U.S.C. § 119(e) to U.S. Provisional Patent Application No. 62,656,694 filed on Apr. 12, 2018 and U.S. Provisional Patent Application No. 62/656,737 filed on Apr. 12, 2018. The above-identified provisional patent applications are hereby incorporated by reference in its entirety.

TECHNICAL FIELD

This disclosure relates generally to encoding and decoding multimedia data. More specifically, this disclosure relates to compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a Three-Degrees-of-Freedom (3DoF) immersive experience. Six-Degrees-of-Freedom (6DoF) is the next level of immersive experience where in the user can turn his head as well as move around in a virtual/augmented environment. Multimedia data that is three-dimensional (3D) in nature, such as point clouds, is needed to provide 6DoF experience.

Point clouds are a set of 3D points that represent a model of a surface of an object or a scene. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission.

SUMMARY

This disclosure provides 3D point cloud compression systems for efficient delivery and access of subset of compressed 3D point cloud.

In a first embodiment, a decoding device for point cloud decoding is provided. The decoding device includes a processor and a communication interface. The communication interface is configured to receive a container including one or more bitstreams. The processor is configured to identify, from the container, individual tracks. The individual tracks include a timed metadata track and media tracks. The timed metadata track references the media tracks. The media tracks correspond respectively to attributes of a 3D point cloud. The processor is also configured to decode the one or more bitstreams to generate frames based on the individual tracks and media content. The frames correspond to the attributes and an occupancy map. The processor is further configured to generate the 3D point cloud using the frames and the timed metadata track.

In another embodiment, an encoding device for point cloud encoding is provided. The encoding device includes a processor and a communication interface. The processor is configured to generate, for a 3D point cloud, frames corresponding to attributes of the 3D point cloud and an occupancy map. The processor is also configured to encode, the frames to generate one or more bitstreams. The one or more bitstreams include individual tracks and media content. The individual tracks include media tracks and a timed metadata track. The timed metadata track references the media tracks. The media tracks correspond respectively to the attributes. The processor is configured to generate a container including the one or more bitstreams. The communication interface is configured to transmit the container.

In yet another embodiment a method for point cloud encoding is provided. The method includes generating, for a 3D point cloud, frames corresponding to attributes of the 3D point cloud and an occupancy map. The method also includes encoding, the frames to generate one or more bitstreams. The one or more bitstreams include individual tracks and media content. The individual tracks include media tracks and a timed metadata track. The timed metadata track references the media tracks and the media tracks correspond respectively to the attributes. The method also includes generating a container including the one or more bitstreams transmitting the container.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
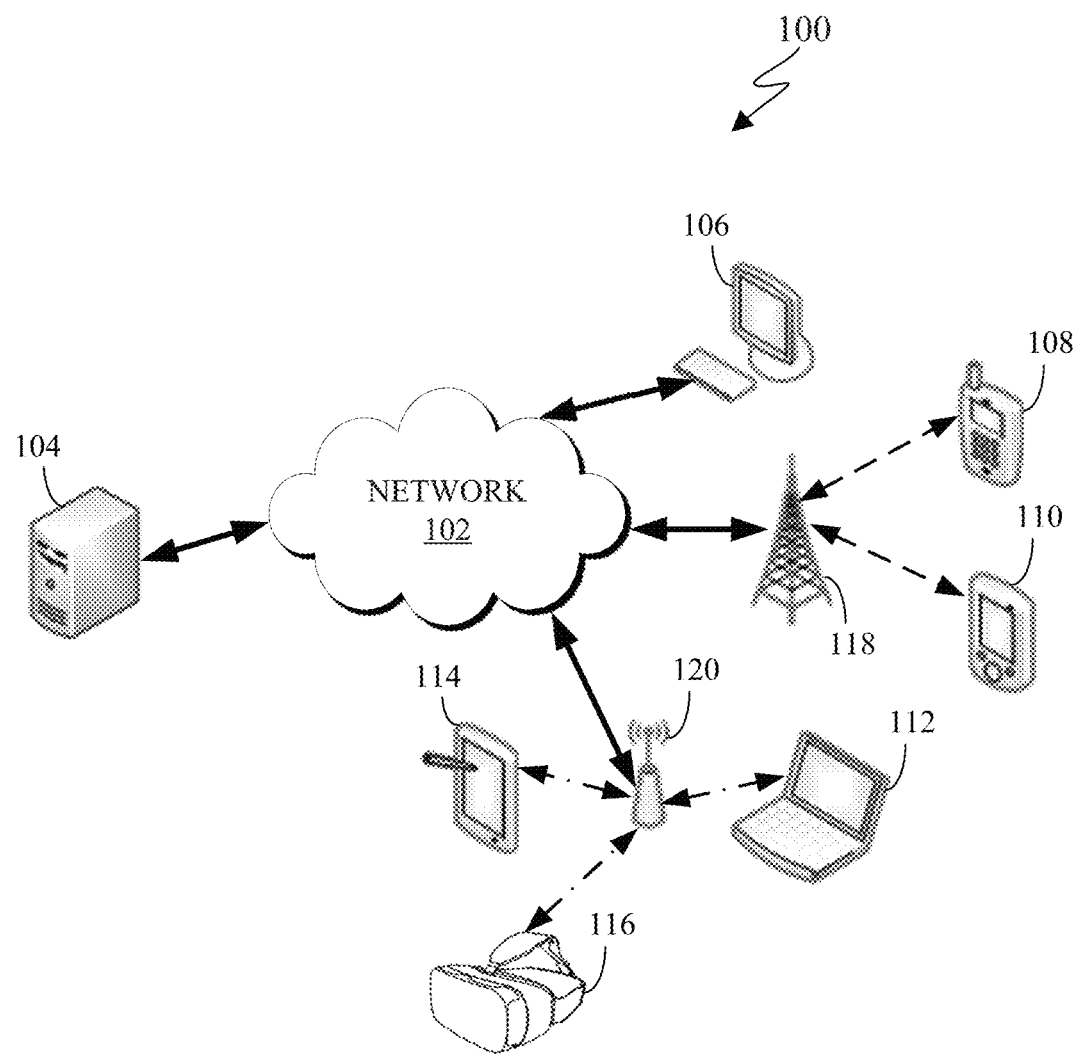
FIG. 1 illustrates an example communication system in accordance with an embodiment of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD is a device that enables a user to view the VR scene and adjust the displayed content based on movements of the head of the user. HMD represent one of many types of devices that provide AR and VR experiences to a user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefiting from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. A point cloud can be similar to an object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of a set of individual 3D points. Each point in a 3D point cloud consists of an attribute such as a geometric position of each point, represented by 3-tuple (X,Y,Z) coordinate values. When each point is identified by the three coordinates, a precise location in 3D environment or space is identified, relative to an origin point and relative to other points of the 3D point cloud. The origin point is a location where the X, Y, and Z axes intersect. In certain embodiments, the points are positioned on the external surface of the object. In certain embodiments, the points are positioned throughout the internal structure and external surfaces of the object. Additionally, depending upon the application, each point in the point cloud can also include additional attributes (also referred to as a texture) such as color, reflectance, intensity, surface normal, and the like. In some embodiments, a single point of a 3D point cloud can have multiple attributes. A texture can refer to an attribute other than the geometry attribute. A first attribute can represent the geometric position of a point, while a second attribute or texture can represent the color of the point, a third attribute or texture can represent the reflectiveness of the point, and yet the point can further be represented by additional attributes or textures such as intensity, surface normal, and the like. In some applications, point clouds can also be used to approximate light field data in which, each point includes multiple view-dependent, color information (R, G, B triplets).

As discussed above, a point cloud includes a set of 3D points that are associated with one or more attributes. A single point cloud can include billions of points, with each point associated with one or more attributes (such as a geographic location and a color). Each attribute occupies a certain number of bits. For example, a geometry attribute of a point cloud occupying ten-bit geometry data, consumes thirty bits for a single point, as each geometric coordinate (the X value, the Y value, and the Z value) uses ten bits. Similarly, a color attribute of a point cloud occupying eight-bit color data, consumes twenty-four bits, as each color component (Red value, Green value, and Blue value) uses eight bits. Therefore, a single point with a ten-bit geometric attribute and an eight-bit color attribute consumes fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times 30 frames per second) are to be transmit from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the rendering of the point cloud; however such hardware components are often expensive. Compressing and decompressing a point cloud by leveraging existing video codecs enables the encoding and decoding of a point cloud to be widely available without the need for new or specialized hardware. However, many video codecs are not able to encode and decode 3D video content, such as a point cloud. According to embodiments of the present disclosure, leveraging existing video codecs can be used to compress and reconstruct a point cloud, when the point cloud is converted from a 3D state to a 2D state. In certain embodiments, the conversion of a point cloud includes projecting the 3D point cloud onto 2D frames by creating patches that represent the 3D point cloud. Thereafter, video codecs such as HEVC, AVC, VP9, VP8, JVNET, and the like can be used to compress a 2D video.

Converting the 3D point cloud includes projecting the 3D point cloud to generate multiple patches and packing the patches into onto one or more 2D frames, such that the frames can be compressed, transmitted to a display device. The frames can represent projections at different surface thicknesses of the 3D point cloud. The frames can also represent different attributes or textures of the 3D point cloud, such as one frame includes geometry positions of the 3D points and another frame includes color of the points. A decoder reconstructs the patches within the 2D frames into the 3D point cloud, such that the 3D point cloud can be viewed by a user. When the point cloud is deconstructed to fit on multiple 2D frames, and compressed the frames can be transmitted using less bandwidth than transmitting the original point cloud.

Embodiments of the present disclosure provide systems and methods for converting a 3D point cloud into a 2D state to compress, transmit, and then reconstruct the 3D point cloud. In certain embodiments, a point cloud is deconstructed into multiple patches, and multiple 2D frames are generated that include patches. In certain embodiments, the patches on one 2D frame represent the same attribute associated with the points of the point cloud, such as a geometric position of the points in 3D space. In other embodiments, the patches on one 2D frame represent multiple attributes associated with the points of the point cloud, such as a geometric position of the points in 3D space and color.

According to embodiments of the present disclosure, architecture for performing point cloud compression and decompression using a video codec is provided. In certain embodiments, an encoder projects the 3D point cloud onto 2D frames and transmits a compressed bitstream representing the 3D point cloud to a decoder. The encoder projects the 3D point cloud onto one or more 2D frames and compresses the frames to generate a compressed bitstream. The encoder can then transmit the compressed bitstream to another device. The 2D frames can be compressed by leveraging various video compression codecs, image compression codecs, or both. A decoder receives the bitstream, decompresses the bitstream into the 2D frames, and reconstructs the 3D point cloud. Reconstructing the 3D point enables the 3D point cloud to be rendered and displayed for a user to observe. In certain embodiments, frames representing different attributes are encoded and decoded separately. In other embodiments, frames representing different attributes are encoded and decoded together.

In certain embodiments, two geometry video frames and two texture video frames are generated by the encoder for a 3D point cloud. In certain embodiments, more than two geometry video frames and more than two texture video frames are generated by the encoder. The multiple frames represent the same projection but at different depths of the point cloud. For example, during projection the encoder decomposes the point cloud into a set of patches by clustering the points. The geometry and color information of these patches are packed into geometry video frames and texture video frames, respectively. The geometry video frames are used to encode the geometry information, and the corresponding texture video frames are used to encode the texture (or other attributes) of the point cloud. Each point within a patch in the geometry video frame corresponds to a point in 3D space. The two transverse coordinates (with respect to the projection plane) of a 3D point corresponds to the column and row indices in the geometry video frame plus a transverse-offset which determines the location of the entire patch within the video frame. The depth of the 3D point is encoded as the value of the pixel in the video frame plus a depth-offset for the patch.

Projecting a 3D point cloud onto 2D frames can miss certain points of the 3D point cloud, such that, when the 3D point cloud is reconstructed, cracks and holes can be introduced in the reconstructed could cloud, as certain points were not transmitted from the original 3D point cloud. For example, when the 3D point cloud is projected into patches, several points of points in the original point cloud can be missed. A point is missed when it is not projected from 3D point cloud to a patch on a 2D video frame. Missed points generally occur near regions of high curvature in the point cloud surface or due to self-occlusions. Additionally, some isolated 3D points are not included in the regular patches as these points they fail to comply with the constraints imposed during the projection onto the 2D frames. For example, the constraints can include a maximum depth constraint, distance from other points in the neighborhood, and the like. During the encoding process, an encoder can gather the missed points, and store the points in a missed points patch. The missed points patch is used by the decoder when reconstructing the 3D point cloud, such that the cracks and holes can be filled in with the points from the missed points patch.

Additionally, projecting a 3D point cloud into patches can separate points of the 3D point cloud that are next to each other in 3D space. For example, two points of a 3D point cloud that are next to each other in 3D space can be allocated into different patches. When the multiple patches are packed into a 2D frame, the points that were once next to each other on the 3D point cloud could be placed at different locations on the 2D frame. When reconstructing the 3D point cloud, the entire 2D frame is decoded since neighboring points can be located throughout the 2D frame. Decoding and reconstructing the entirety of the 2D frame when only a portion of the 3D point cloud is needed, introduces inefficiency into the system.

Embodiments of the present disclosure also provide systems and methods for improving the transmission and reconstruction of a 3D point cloud. Improving the transmission and reconstruction of a 3D point cloud reduces the bandwidth required for the transmission as well as reduces the processing power required to reconstruct the 3D point cloud. For example, the transmission of a bitstream can be improved my modifying the structure of the bitstream itself. For instance, instead of a single multiplexed bitstream with the components sequentially ordered as a group of frames, embodiments of the present disclosure modify the structure of the bitstream itself to enable real-time streaming as well as communication over internet protocol (IP) networks. In another example, the reconstruction of a 3D point cloud can be improved by enabling a decoder to reconstruct certain portions of the 3D point cloud. Improving the transmission and reconstruction of a 3D point cloud provides for increased availability for the bitstream to be streamed to the decoder and display device to render the reconstructed 3D point cloud.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another e4xample, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and server 104

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client device 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
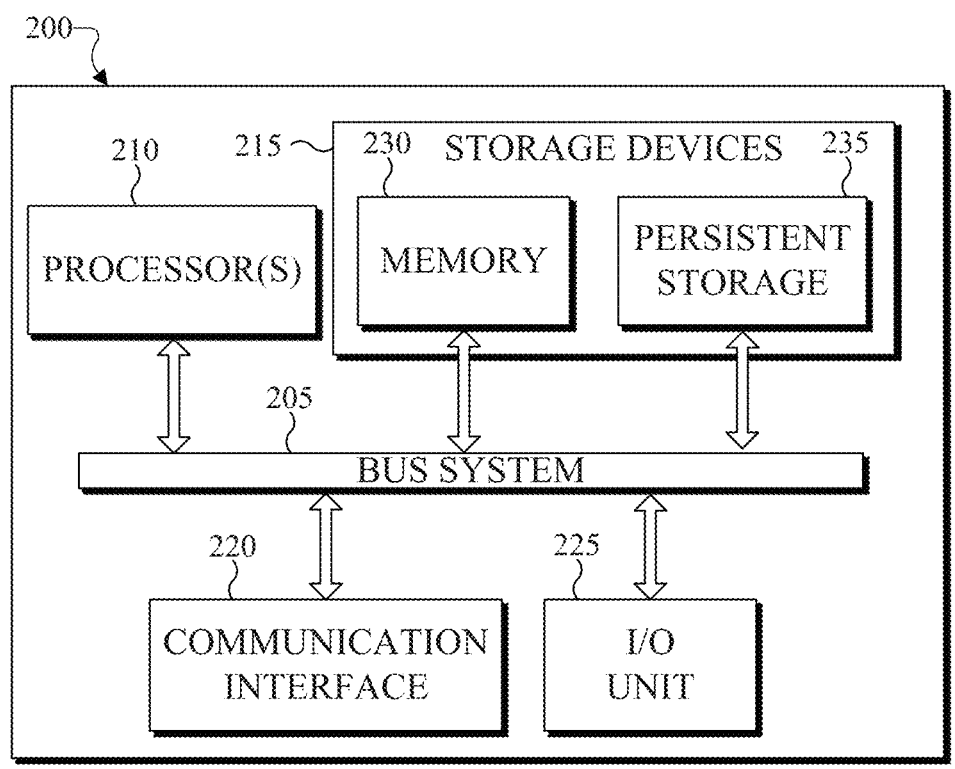
FIGS. 2 and 3 illustrate example electronic devices in accordance with an embodiment of this disclosure.
Figure 3:
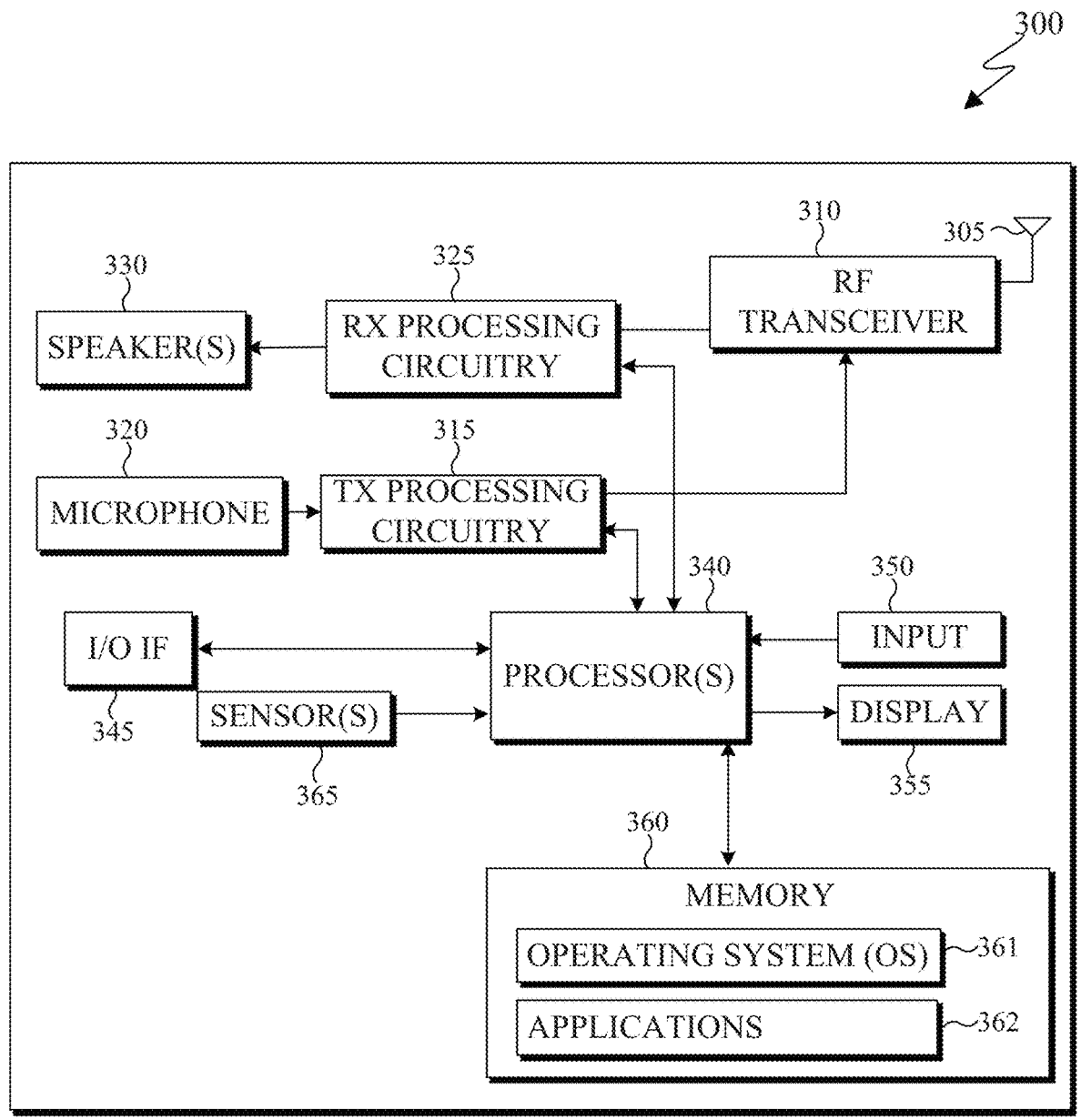

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD).

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a 3D point cloud, the electronic device 300 can project the 3D point cloud into multiple patches. For example, a cluster of pixels of the 3D point cloud can be grouped together to generate a patch. A patch can represent a single attribute of the 3D point cloud, such as geometry, color, and the like. Patches that represent the same attribute can be packed into a 2D frame. As discussed in greater detail below, FIG. 7C depicts a 2D color frame that includes patches of a 3D point cloud of FIG. 7A. The 2D frames are then encoded to generate a bitstream. During the encoding process additional content can be included such as metadata, flags, an occupancy map, and the like.

Similarly, when decoding media content, such as a bitstream that represents a 3D point cloud, the electronic device 300 decodes the received bitstream into 2D frames. In certain embodiments, the decoded bitstream also includes an occupancy map. The decoded bitstream can also include one or more flags, or quantization parameter size, or any combination thereof. A geometry 2D frame can include points that indicate coordinates, such as a geographic location of each point of a 3D point cloud. Similarly, a color 2D frame can include points that indicate the RGB color of each geometric point of the 3D point cloud. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
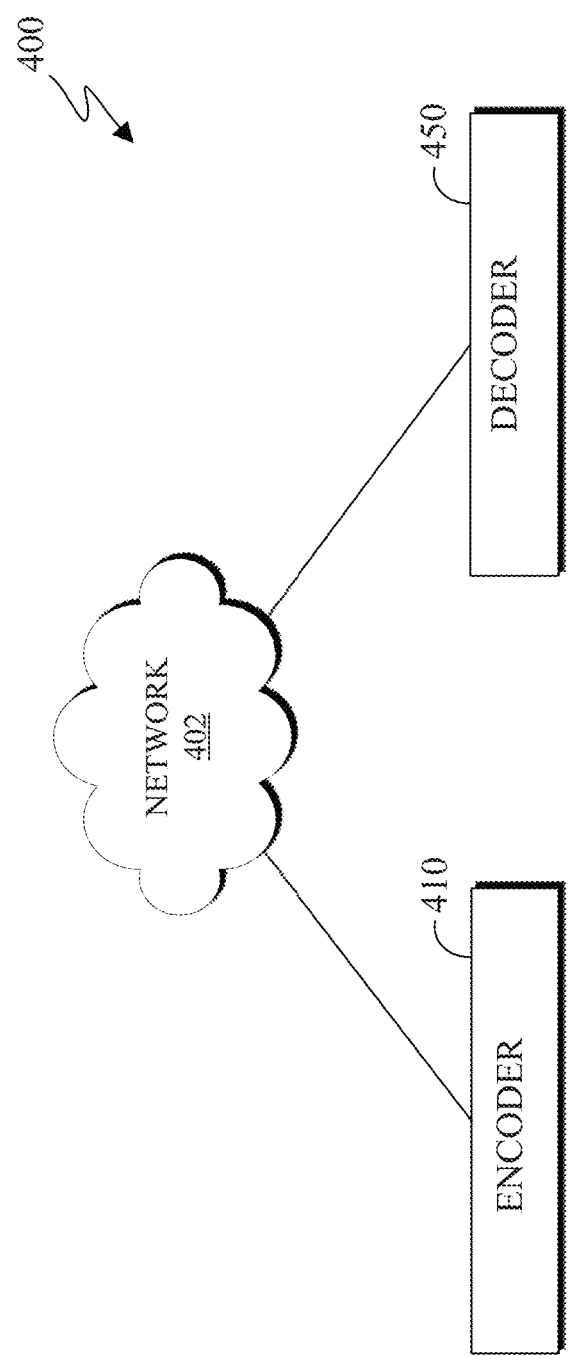
FIG. 4A illustrates a block diagram of an example environment-architecture in accordance with an embodiment of this disclosure.
Figure 4B:
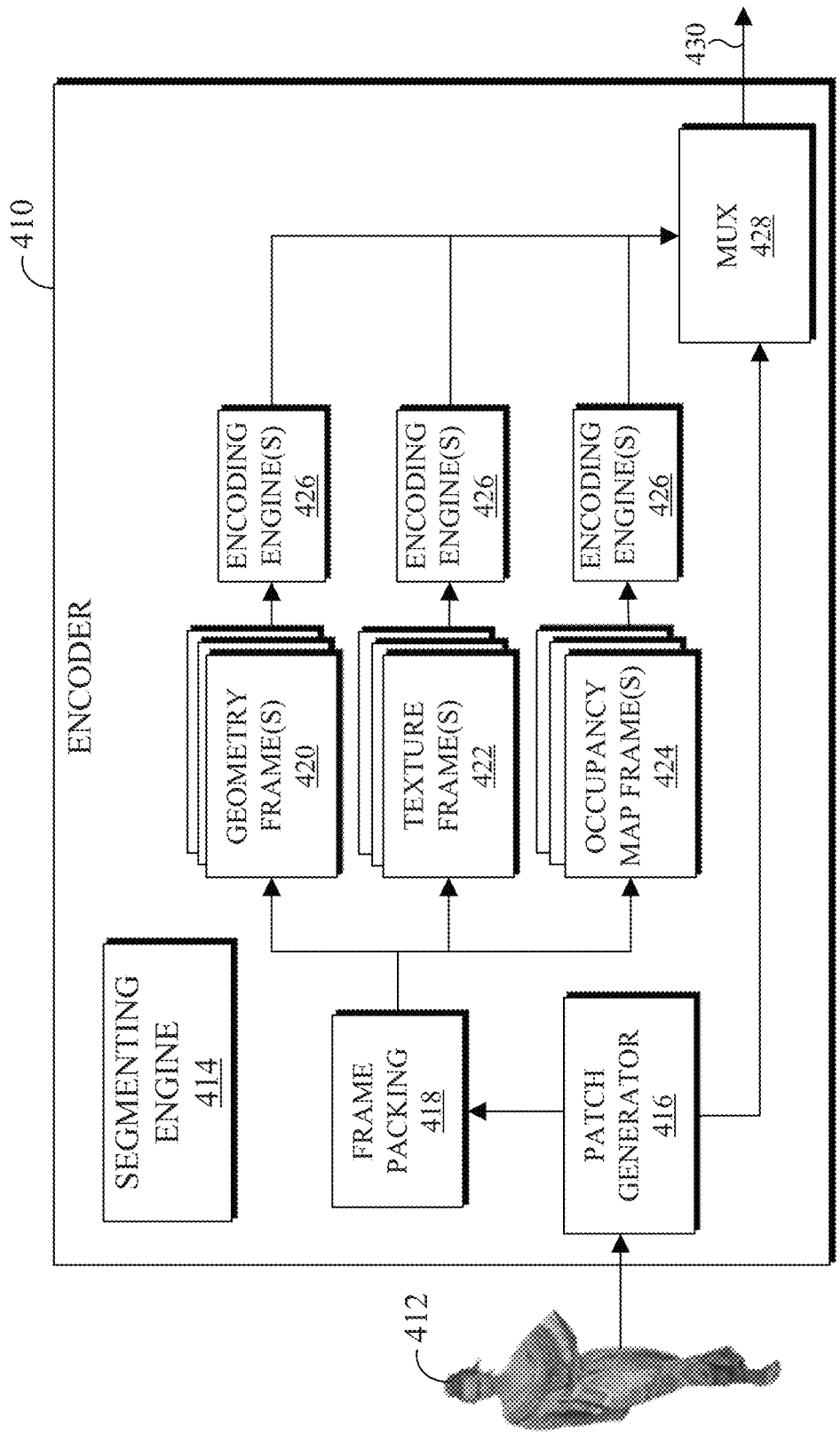
FIG. 4B illustrates an example block diagram of an encoder in accordance with an embodiment of this disclosure.
Figure 4C:
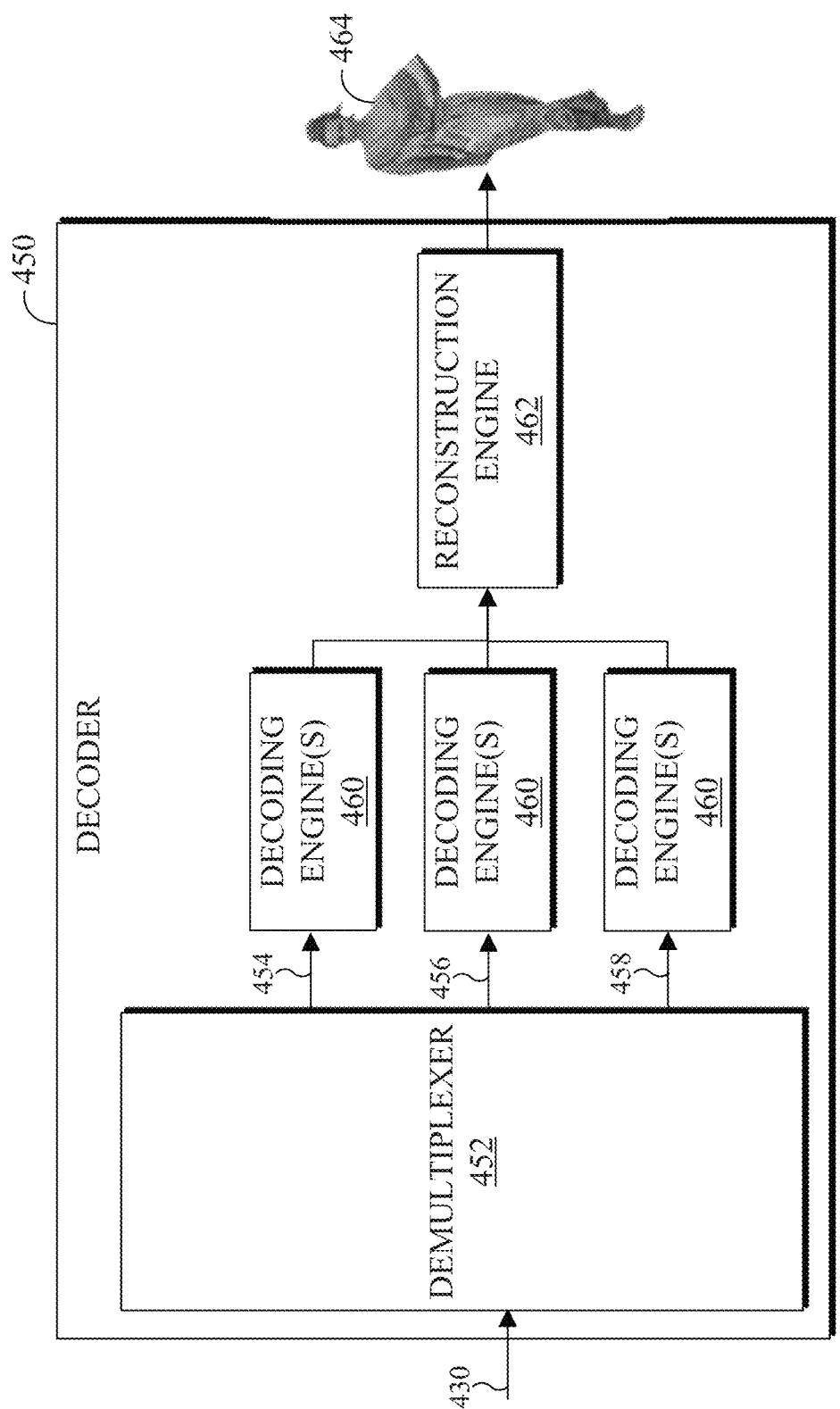
FIG. 4C illustrates an example block diagram of a decoder in accordance with an embodiment of this disclosure.

FIG. 4A illustrates a block diagram of an example environment-architecture 400 in accordance with an embodiment of this disclosure. As shown in FIG. 4A, the environment-architecture 400 includes an encoder 410 and a decoder 450 in communication over a network 402. FIG. 4B illustrates an example block diagram of the encoder 410 of FIG. 4A in accordance with an embodiment of this disclosure. FIG. 4C illustrates an example block diagram of the decoder 450 of FIG. 4A in accordance with an embodiment of this disclosure. The embodiments of FIGS. 4A, 4B, and 4C are for illustration only. Other embodiments can be used without departing from the scope of this disclosure.

The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository that contains a VR and AR media content that can be encoded by the encoder 410 or rendered and displayed on an electronic device associated with the decoder 450.

In certain embodiments, the encoder 410 and the decoder 450 can represent the server 104, one of the client devices 106-116 of FIG. 1, the server 200 of FIG. 2, the electronic device 300 of FIG. 3, or other suitable device. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

In this example, the encoder 410 can be included in a server, such the servers 104 or 200. The encoder 410 is described with more below in FIG. 4B. The encoder 410 can receive 3D media content, such as a point cloud, from another device such as a server (similar to the server 104 of FIG. 1, the server 200 of FIG. 2) or an information repository (such as a database). In certain embodiments, the encoder 410 can receive media content from multiple cameras and stitch the content together to generate a 3D scene.

In certain embodiments, encoder 410 projects a 3D point cloud into two dimensions and creates patches representing the projection. The encoder 410 clusters pixels of a point cloud into groups which are projected onto XY, YZ, and XZ planes. The encoder 410 packs the patches representing the 3D point cloud onto 2D frames, and encoding images for transmission. The encoder 410 then maps the patches to the locations of each patch on the 3D point cloud. The encoder 410 encodes, and transmits a point cloud as an encoded bitstream. In certain embodiments, the encoded 410 transmits a container that includes multiple bitstreams. The container (or bitstream) can be transmitted to an information repository (such as a database) or an electronic device that includes a decoder (such as the decoder 450), or the decoder 450 itself through the network 402. The encoder 410 is described with more below in FIG. 4B.

The decoder 450 can receive a container or bitstream that represents 3D media content, such as a 3D point cloud. The container can include multiple bitstreams. The bitstreams can include 2D frames representing a 3D point cloud. The decoder 550 can decode the bitstream and generate the 3D point cloud from multiple 2D frames. In this example, the decoder 450 can be included in any of the client devices 106-116, such as the HMD 116. The decoder 450 is described with more below in FIG. 4C.

FIG. 4B illustrates the encoder 410 which receives a 3D point cloud 412 and generates a container 430 including one or more bitstreams. The encoder 410 includes a segmenting engine 414, a patch generator 416, a frame packing 418, various frames (such as one or more geometry frames 420, one or more texture frames 422, and one or more occupancy map frames 424), one or more encoding engines 426 and a multiplexer 428. The 3D point cloud 412 can be stored in memory (not shown) or received from another electronic device (not shown). The 3D point cloud 412 can be a single 3D object, or a grouping of 3D objects. The 3D point cloud can be stationary or move such as video, and the like. The encoder 410 generates a container 430 which can include multiple bitstreams and can be transmitted via the network 402 of FIG. 4A to another device, such as the decoder 450.

The segmenting engine 414 forms a relationship between the location of each point, of the point cloud 412, in 3D space and its location on a 2D frame. For example, the segmenting engine 414 divides a 3D point cloud into multiple mutually exclusive subsets and correlates each point with a subset, such that each point of a 3D point cloud belongs of a particular subset. Equation (1) describes relationship between the segments.

$$s_i \cap s_j = \emptyset \text{ for } i \neq j \text{ and } U_0^{N-1} S_j = S \quad (1)$$

The segment $S_i$ and $S_j$ represent any two cuboids. FIG. 7B, below, illustrates an example grid depicting multiple segments. With respect to any two cuboid, (such that the segment $S_i$ is not the same as the segment $S_j$), the cuboids are mutually exclusive, such that any two cuboids do not overlap. Additionally, the subsets span the entirety of the point cloud 412, such that all points (or pixels) of the 3D point cloud 412 are included in one of the subsets. For example, if all the subsets were merged together, no holes are formed within the space. Additionally a point, of the 3D point cloud that is within one subset, is not included in any other subset. For example, any point of the 3D point cloud is located in only one subset. In certain embodiments, a subset can occupy certain points that are spatially unrelated, or certain points that are in a similar area. In certain embodiments, each subset can correspond to a 3D spatial region. A 3D spatial region is an area in 3D space where points within a particular subset are located. In certain embodiments, the 3D spatial region can be any shape. For example, the shape can be amorphous and form around the points within the 3D spatial region. In another example, the shape can be a circle or sphere. In another example, the shape can be a cuboid. FIG. 7B below illustrates a 3D spatial region resembling a cuboid. In another example, the shape can be a conical or cylindrical. Other shapes can be appreciated by those skilled in the art.

In certain embodiments, the number of subsets or cuboids that the 3D point cloud 412 is divided into is predetermined. In certain embodiments, the segmenting engine 414 determines the number of subsets or cuboids that span the 3D point cloud. For example, the segmenting engine 414 can determine the number of subsets based on the size of the 3D point cloud 412. In another example, the segmenting engine 414 can determine the number of subsets based on the level of detail of the 3D point cloud 412. For instance, if certain portions of a 3D point cloud are highly detailed, such as the face of a human, while other portions of a 3D point cloud include a lower level of detail, then the segmenting engine 414 can create more cuboids within the area of the 3D point cloud of higher detail than the areas of the 3D point cloud that include a lower level of detail. In certain embodiments, a predetermined ratio can indicate the number of subsets at one level of detail to the number of cuboids at another level of detail.

To accommodate a larger number of subsets within a certain area, the segmenting engine changes the size or the shape or both the size and the shape of subsets within the area. The segmenting engine 414 can determine the size of each subsets as well as the shape of each subsets. In certain embodiments, the size and shape of each subset is predetermined. It should be noted, that subsets can differ in in size and shape while spanning the entire 3D point cloud.

The segmenting engine 414 generates metadata, such as correspondence information, that relates each point of the 3D point cloud 412 to a particular subset. In certain embodiments, the correspondence information relates each point of the 3D point cloud 412 to a particular 3D spatial region. The correspondence information can also relate points of the 3D point cloud, such as those that are within a particular 3D spatial region, to pixels on a 2D frame. The correspondence information indicates which subsets, or 3D spatial region the pixels on a 2D frame originated from. The correspondence information indicates a particular subset that each point in 3D space is located within, such that when the point is projected and packed into a 2D frame, the point is still correlated to the subset which the point was originally located within. The correspondence information can be multiplexed by the multiplexer 428 and included in the bitstream to a decoder, such as the decoder 450. In certain embodiments, the correspondence information can be transmitted before the container 430 that includes the one or more bitstreams.

In certain embodiments, the segmenting engine 414 can segments the 3D point cloud 412 into multiple subsets. For example, a first subset can indicate a low level of detail (LoD) and a second subset can include the remaining points in the region. In another example, a first subset can indicates a high level of detail (HoD) and a second subset indicates a LoD. In certain embodiments, the segmenting engine 414 can identify a spatial region that includes a HoD. For example, the segmenting engine 414 can identify a region that includes a higher resolution than another region of the 3D point cloud. In certain embodiments, the LoD can be created by reducing the resolution of the points within the cuboid. Both subsets (the LoD and the HoD) can be encoded and transmitted to the decoder 450. In certain embodiments, the LoD and the HoD are included in the same 2D frame. In other embodiments, the LoD and the HoD are included in separate 2D frames. In certain embodiments, the multiple subsets can be included in different motion constrained tiles.

A patch can include points from one or more subsets. In certain embodiments, if a patch includes points from one or more subsets, then the correspondence information indicates that a particular patch includes points from the each of the one or more subsets.

In certain embodiments, the location of pixels of the 3D point cloud 412 can be represented by a motion constrained tile, a tile index, a slice segment address, or a coding tree block address, or any combination thereof. A motion constrained tile is used to limit motion prediction across different tiles at the decoder. Each motion constrained tile can be linked to one or more cuboids and patches from the respective cuboids. For example, when projecting the 3D point cloud 412 into patches, the patches within a motion constrained tile include the points that the cuboid associated therewith, such that each patch includes points of the 3D point cloud from the cuboids associated with the motion constrained tile. In certain embodiments, a motion constrained tile can include patches associated with one or more subsets. In certain embodiments, multiple tiles, slices or coding tree units can be associated with one subset. Similarly, one subset can be associated with multiple tiles, slices or coding tree units. In certain embodiments, the segmenting engine 414 determines the number of motion constrained tile sets to minimize the number of tiles that need to be delivered or decoded corresponding to a single subset of 3D point cloud. In certain embodiments, each motion constrained tile set includes a single tile.

The patch generator 416 decomposes the 3D point cloud 412 and creates multiple patches. The patches can be organized by an attribute, such as geometry, texture, reflectiveness, material, and the like. Geometry (such as the geometry frames 420) represent is the geographic location of each point of the 3D point cloud 412. Texture (such as the texture frames 422) represents a single aspect of each point of the 3D point cloud 412, such as color. Each geometry frame 420 has at least one corresponding texture frame 422. For example, if the geometry frame 420 indicates where each point of the 3D point cloud 412 is in 3D space, then the corresponding texture frame 422 indicates the color of each corresponding point. In certain embodiments, additional frames can be created that represent the other attributes. For example, if another set of frames are generated, such as reflectance frames (not shown) then the corresponding reflectance frame indicates the level of reflectance of each corresponding point.

The patch generator 416 generates patches by projecting a 3D point cloud 412 onto a 2D surface, or frame. For example, the patch generator 416 can generate multiple frames of the same 3D point cloud using two or more projection planes. In certain embodiments, the patch generator splits geometry aspects of each point of a point cloud and texture components of each point of a point cloud, to be stored on respective geometry frames 420 or the texture frames 422.

The frame packing 418 sorts and packs the patches (both the geometry and texture patches) into respective frames, such as the geometry frames 420 and the texture frames 422. In certain embodiments, frame packing 418 generates one or more occupancy map frames 424 based on the placement of the patches within the geometry frames 420 and the texture frames 422. In certain embodiments, the frame packing 418 groups similar attributes within the same frame. For example, the geometry frames 420 includes patches of points that represent the geometry of the 3D point cloud 412, whereas the texture frames 422 include patches of points that represent the texture of the 3D point cloud 412.

In certain embodiments, after the segmenting engine 414 segments the point cloud into multiple subsets (such as cuboids), the frame packing 418 can include patches from each subset into a particular frame corresponding to a respective attribute. For example, for a single subset, the patches representing geometry of one subset can be packed into one of the geometry frames 420 while the patches representing geometry of one subset can be packed into different geometry frames 420. Similarly the patches representing texture of one subset will be packed into one of the texture frames 422 and patches representing texture of a different subset can be packed into a different texture frame 422. In certain embodiments, after the segmenting engine 414 segments the point cloud into multiple subsets, the frame packing 418 can include pixels associated with the different subsets into a one or more motion constrained tiles that correspond to a respective attribute within one or more 2D frames. For example, for each subset, the patches representing geometry will be packed into one or more motion contained tiles and included in one of the geometry frames 420. Similarly, the patches representing texture will be packed into one or more motion contained tils and included in one of the texture frames 422. In certain embodiments, the frame packing 418 includes patches from different subsets into the same 2D frame.

The occupancy map frames 424 represent occupancy maps that indicate the valid pixel locations in the frames (such as the geometry frames 420 and the texture frames 422). The valid pixels are the actual points of the 3D point cloud 412 which are projected into patches (via the patch generator 416) and packed into respective frames (via the frame packing 418). For example, the occupancy map frames 424 indicate whether a point in a frame is a valid pixel or an invalid pixel. A valid point on the occupancy map indicates a pixel on the 2D frame that corresponds to a 3D point in the point cloud. Conversely, an invalid point on the occupancy map indicates an invalid pixel on the 2D frame. An invalid pixel does not correspond to a point of the 3D point cloud 412. In certain embodiments, one of the occupancy map frames 424 correspond to the both a geometry frame 420 and a texture frames 422.

In certain embodiments, the geometry frames 420 and the texture frames 422 can each represent groupings of projections of the 3D point cloud 412. For example, a projection of the 3D point cloud 412 can be made at different depths. For instance, two or more geometry frames can include projections at different depths. Regardless of the number of depth images that are generated for an input point cloud frame, each image is separated from the previous frame or a subsequent frame by a surface thickness. The surface thickness indicates the difference between two corresponding depth images.

The geometry frames 420, the texture frames 422, and the occupancy map frames 424 are encoded via the encoding engine 426. In certain embodiments, the frames (geometry frames 420, the texture frames 422, and the occupancy map frames 424) are encoded by independent encoders. For example, one encoding engine can encode the geometry frames 420, another encoding engine can encode the texture frames 422, and yet another encoding engine can encode the occupancy map frames 424. In certain embodiments, the encoding engine 426 can be configured to support an 8-bit, a 10-bit, a 12-bit, a 14-bit, or a 16-bit, precision of data. The encoding engine 426 can be a video or image codec such as HEVC, AVC, VP9, VP8, JVNET, and the like to compress the 2D frames representing the 3D point cloud. In certain embodiments, a loop-filtering is disabled across tile boundaries during encoding via the encoding engine 426. In certain embodiments, the encoding engines 426 multiple generate bitstreams The multiplexer 428 combines multiple bitstreams, to create a container 430. The multiplexer 428 is also able to combine the metadata such as the correspondence information into the container.

Figure 5:
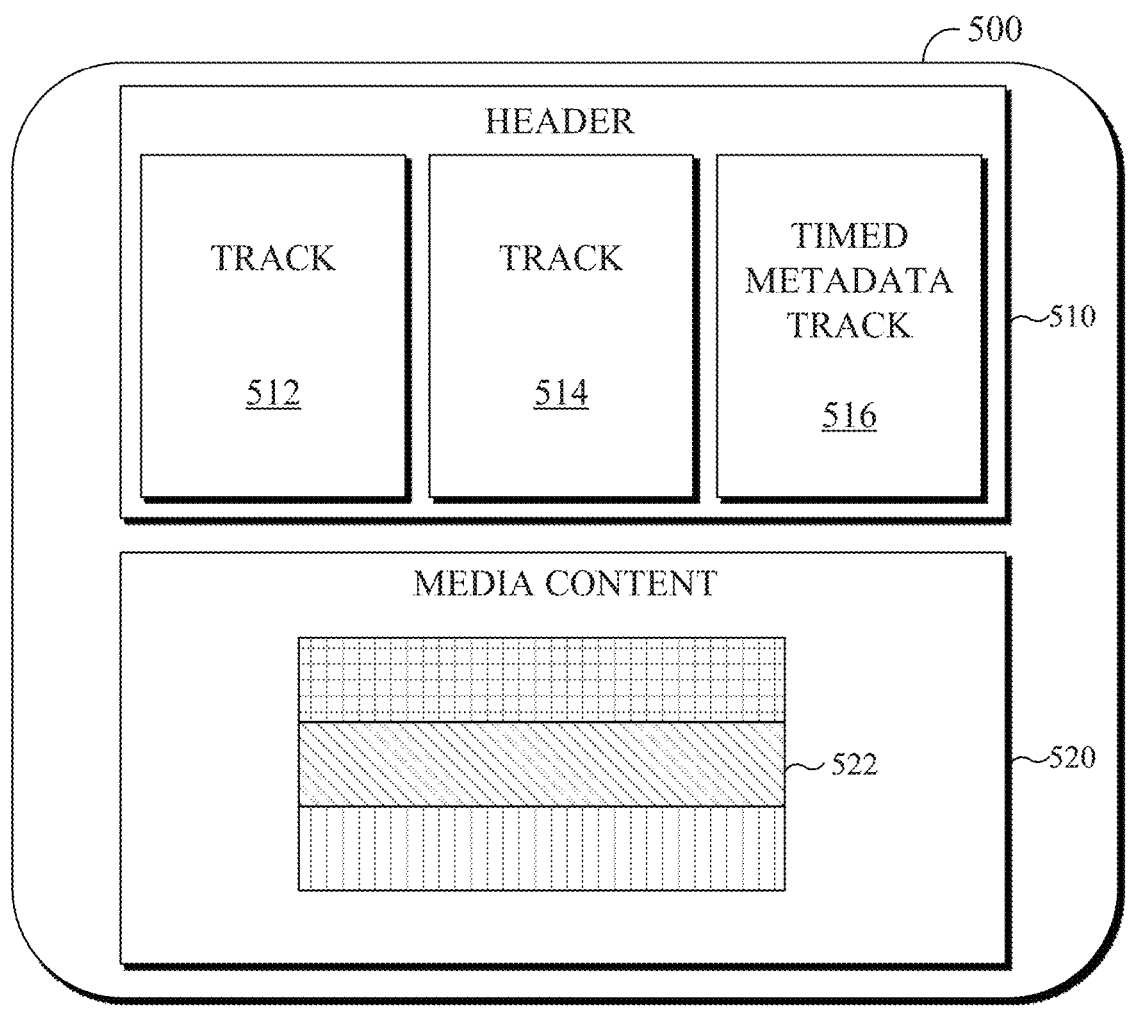
FIGS. 5 and 6 illustrate an example bitstream structure in accordance with an embodiment of this disclosure.
Figure 6:
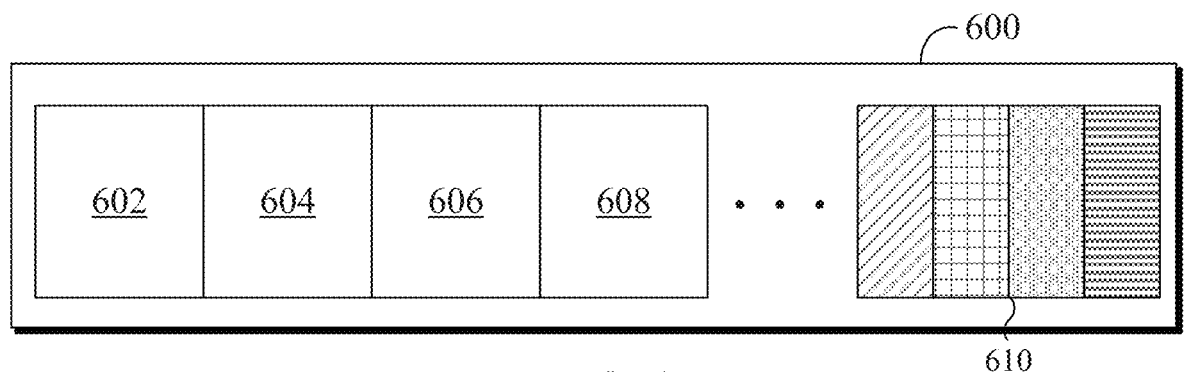

When the encoding engine 426 and the multiplexer 428 generate the bitstream, the bitstream can include a first portion and a second portion. For example, if the encoding engine 426 uses an HEVC codec, the first portion represents the movie header box (MOOV) or the movie fragment box (MOOF) while the second portion represents the media data box (MDAT). The first portion can include individual tracks, such as media tracks and a timed metadata track. Each media track corresponds to a different attribute of the 3D point cloud 412. For example, if there are two attributes, such as geometry and color, then the first portion includes three tracks, that of a geometry track, a color track, and a timed metadata track. In another example, if there are three attributes then the first portion includes four tracks, corresponding to the three attributes, respectively and the timed metadata track. The timed metadata track is a primary track that is associated with each of the media tracks that correspond to the various attributes of the 3D point cloud. In certain embodiments, the media tracks are subsidiary tracks that are related to the timed metadata track. The timed metadata data track synchronizes the metadata content with the media content, both of which are stored in the second portion. The second portion includes the media content that represents the 2D frames (both the geometry frames 420, the texture frames 422). The second portion also includes various types of metadata content, such as the occupancy map frames 424 and any information associated with points that were missed via the patch generator 416, the correspondence information, and the like. FIGS. 5 and 6, below, further describe the structure and architecture of the bitstream.

FIG. 4C illustrates the decoder 450 that includes a demultiplexer 452, a decoding engine 460, and a reconstruction engine 462. The decoder 450 receives the container 430 that originated from the encoder 410. The demultiplexer 452 separates various bitstreams from the container 430. For example, the demultiplexer 452 separates various streams of data such as the geometry frame information 454 (originally the geometry frames 420 of FIG. 4B), texture frame information 456 (originally the texture frames 422 of FIG. 4B), and the occupancy map information 458 (originally the occupancy map frames 424 of FIG. 4B).

The decoder 450 can identify from the container the individual tracks via the bitstreams. For example, the bitstream of the geometry frame information 454, the bitstream of the texture frame information 456, and the bitstream of the occupancy map information 458 are decoded, via the decoding engine 460, to generate the 2D video frames representing the geometry and texture of the 3D point cloud as well as the and occupancy map frames. In certain embodiments, separate, parallel decoding engines similar to the decoding engine 460, can process each received bitstream.

The reconstruction engine 462 generates a reconstructed point cloud 464 by reconstructing decoded geometry frames, the decoded texture frames, and the occupancy map frames. In certain embodiments, the reconstructing engine 462 can reconstruct a portion of the point cloud. The reconstructed point cloud 464 should be similar to the 3D point cloud 412. For example, if a certain portion of the point cloud is to be rendered on a display, the reconstructing engine 462 analyzes the correspondence information included in the metadata of the bitstream, and reconstructs the portion of the point cloud based on the patches that are included in the cuboid corresponding to the portion of the point cloud that is to be rendered.

In certain embodiments, the decoder 450 receives and processes the correspondence information before receiving the container 430. Receiving and processing the correspondence information before receiving the container 430 enables the decoder 450 to receive or decode only those tiles necessary to get the decoded pixels corresponding to a specific subset of 3D point cloud.

If a LoD and a HoD subsets for each subset are included in the container 430, the decoder 450 can select which subset (the LoD or the HoD) to decode. For example, the decoder 450 can be preprogrammed to select the HoD when it is available. In another example, the decoder 450 can be preprogrammed to select the LoD when available. In yet another example, the decoder 450 can decode LoD when on streaming over cellular data and decode HoD when on Wi-Fi. In another example, the decoder 450 can chose which subset to decode and render. In certain embodiments, if only certain subsets are being rendered, then the decoder 450 can also decode one or more subsets that are adjacent to the rendered subset, such that the decoder can quickly render the adjacent subsets in the event the FOV of the user changes. When decoding adjacent subsets, the decoder can decode the LoD subset to enable rendering with less delay, than HoD.

Although FIG. 4A illustrate the environment-architecture 400, FIG. 4B illustrates the encoder 410, and FIG. 4C illustrates the decoder 450 various changes can be made to FIGS. 4A, 4B, and 4C. For example, any number of encoders or decoders can be included environment-architecture 400.

FIGS. 5 and 6 illustrate an example bitstream structure in accordance with an embodiment of this disclosure. As shown in FIG. 5, an example bitstream 500 represents an example structure and includes a first portion 510 and a second portion 520. FIG. 6 illustrates a serialized bitstream 600. The embodiments of FIGS. 5 and 6 are for illustration only. Other embodiments can be used without departing from the scope of this disclosure.

The structure of the example bitstream 500 includes a first portion 510 and a second portion 520. The first portion 510 includes header information, while the second portion 520 includes the media content.

The first portion 510 includes a set of tracks, such as track 512, track 514, and a timed metadata track 516. It should be noted that additional tracks can be included beyond that of track 512 and track 514. Each track represents a media type that corresponds to a particular attribute of the 3D point cloud. In certain embodiments, a track represents a container for metadata related to one stream or attribute of the 3D point cloud. For example, a track can indicate a location within the second portion 520 that particular media content is stored, such that the media content can be reconstructed and played at a particular time instance.

The timed metadata track 516 synchronizes the media content associated with the various tracks (such as tracks 512 and 514) that are included in the first portion 510. For example, the timed metadata track 516 synchronizes the media content associated with all of the tracks included in the first portion 510. The timed metadata track 516 can include information associated with tracks 512 and 514, such that the timed metadata track 516 indicates when certain tracks are to access the media content 522 within the second portion 520. The timed metadata track 516 can define an access unit of point cloud compression (PCC) data. In certain embodiments, a PCC header is stored in a sample entry of the timed metadata track 516. The timed metadata track 516 can include correspondence information associating pixels within the 2D frames to the points of the 3D point cloud.

The metadata included in the tracks 512 and 514 indicate locations that the media content 522 that is stored throughout the second portion 520. The media content that is stored within the second portion 520 can be interleaved, such that encoded geometry frames and encoded texture frames are mixed. Additionally, the timed metadata track 516 indicate locations that metadata such as occupancy maps, missed points patches, the correspondence information, and the like, can be mixed with the encoded geometry frames and the encoded texture frames in the second portion 520.

If an HEVC codec is used to encode and decode the example bitstream 500, then the first portion 510 represents a MOOV or MOOF box while the second portion 520 represents a MDAT box. The MOOV or MOOF boxes indicate unique containers or tracks (such as tracks 512 and 514) that include metadata as well as a timed metadata track 516.

The structure of the serialized bitstream 600 represents an example ordering for PCC data. Tracks 602, 604, 606, and 608 represent a single access unit that contains the data associated with a similar time stamp. The access unit is byte aligned and commences with a start code 602. Following the start code 602, the start code the PCC metadata unit 604 will include a particular code. The code indicates the content of embedded data. The code can include a numeric integer such as 0, 1, 2. The code can indicate a PCC header parameter set, a compressed occupancy map, information associated with an auxiliary patch (such as a missed points point), and the like. If the code indicates a PCC header parameter set the content can include information from the stream header as well as information relative to one of the 2D frames (such as the geometry frame 420 or the texture frame 422 of FIG. 4B). If the code indicates a compressed occupancy map, the embedded data is part of the occupancy map (such as the occupancy map frame 424 of FIG. 4B. If the code indicates information associated with an auxiliary patch, the embedded data is part of the auxiliary patch information. In addition to indicating the type of data, the PCC metadata unit 604 includes the number of tracks containing components of an encoded point cloud such as geometry component, color component and the like. The PCC metadata unit 604 also indicates the length of each tracks containing components of an encoded point cloud.

The geometry track 606 can be represented by a network abstraction layer unit (NALU). Similarly, the color track 608 can be represented by a NALU. Additional attributes can be included as indicated by the PCC metadata unit 604. The serialized bitstream 600 can include one or more additional access units 610. The additional access units 610 are similar in structure to that of the tracks 602, 604, 606, and 608.

Although FIG. 5 illustrates an example structure of the bitstream 500 and FIG. 6 illustrates an example of a serialized bitstream 600 various changes can be made to FIGS. 5 and 6. For example, any number of tracks can be included in the bitstream 500.

Figure 7A:
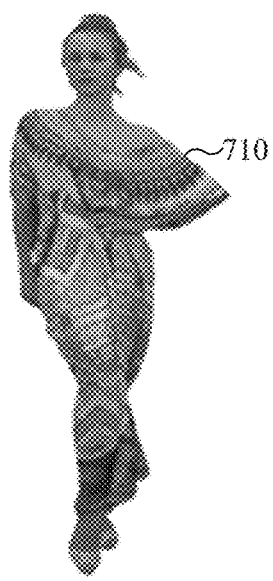
FIGS. 7A, 7B, and 7C illustrate an example projection of a 3D point cloud into patches on a 2D frame.
Figure 7B:
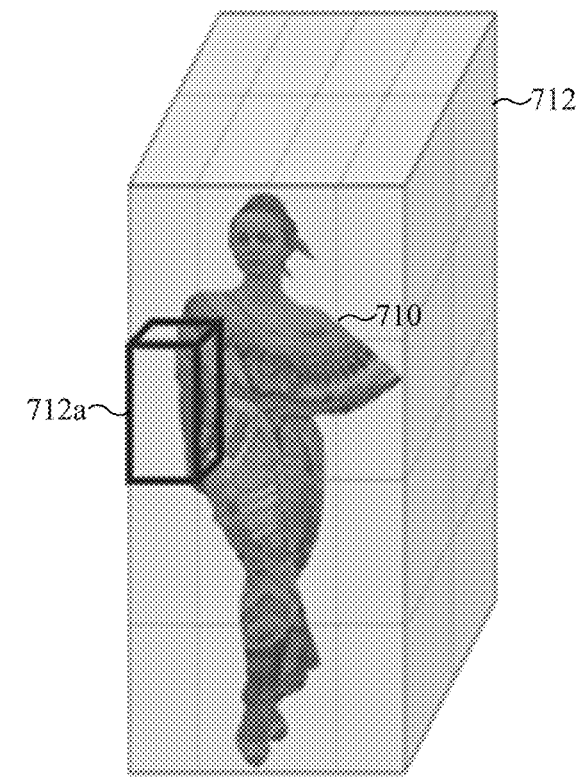
Figure 7C:
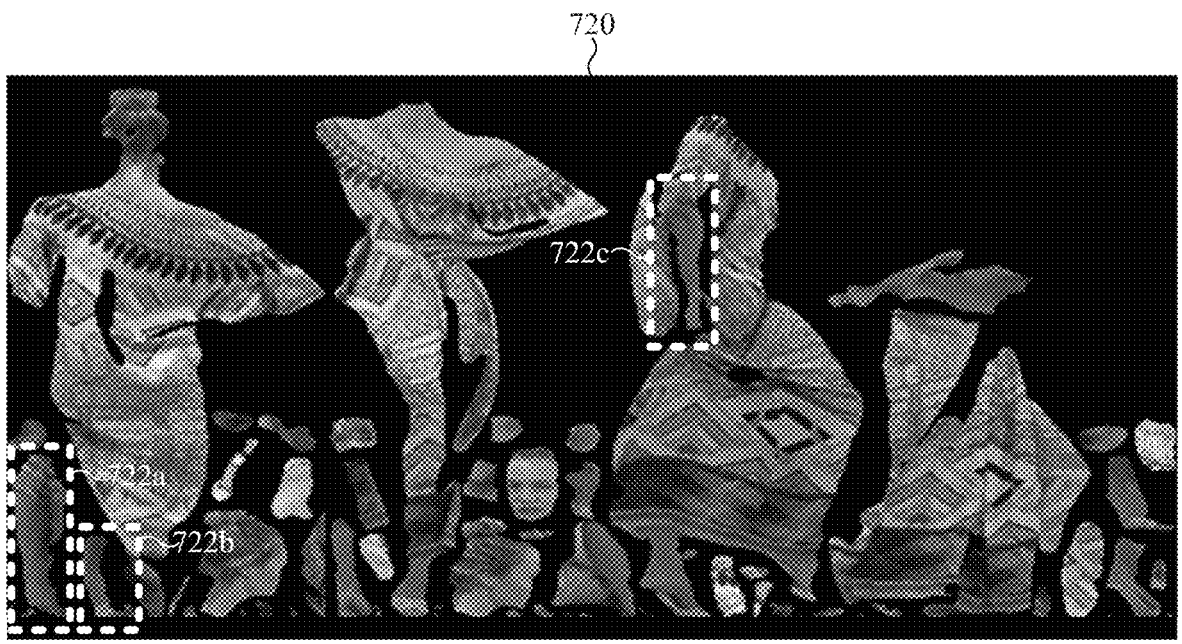

FIGS. 7A, 7B, and 7C illustrate an example projection of a 3D point cloud into patches on a 2D frame. In particular, FIG. 7A illustrates a 3D point cloud 710. FIG. 7B illustrates multiple segments or cuboids 712 segmenting the point cloud 710. FIG. 7C illustrates illustrate a 2D frame 720 that includes patches. The 2D frame 720 includes color patches, which represent the color associated with each patch of the 3D point cloud 710. The embodiment of FIGS. 7A, 7B, and 7C are for illustration only and other embodiments could be used without departing from the scope of this disclosure.

The 3D point cloud 710 is similar to the point cloud 412 of FIG. 4B and the reconstructed point cloud 464 of FIG. 4C. The 3D point cloud 710 is a set of data points in 3D space. Each point of the 3D point cloud includes multiple attributes such as (i) geometric position that provides the structure of the 3D point cloud and (ii) one or more textures that provide information about each point such as color, reflectiveness, material, and the like.

When the 3D point cloud 710 is projected onto 2D frames, the frames are organized by attribute. For a given geometry frame, there are one or more texture frames that indicate various texture attributes for the geometry frame. For example, frame 720 of FIG. 7C illustrates an example color frame. The frame 720 includes multiple patches that that when combined form a reconstructed version of the 3D point cloud 710.

The segmenting engine 414 of FIG. 4B divides the 3D point cloud 710 into multiple subsets, identified as cuboids 712. Each cuboid 712 occupies a particular space such that no holes are formed between two cuboids and no two cuboids overlap. For example, the cuboid 712a represents the right arm of the 3D point cloud 710. The segmenting engine 414 generates the correspondence information that relates each point in 3D space to a particular 3D spatial region or cuboid, such that when the points within a given cuboid are projected onto a 2D frame, the pixels on a 2D frame are associated with the points within the particular cuboid in 3D space.

FIG. 7C illustrates the 2D frame 720 that includes multiple patches representing the color of the 3D point cloud 710. The location of the patches within a set of 2D frames (such as a geometry frame 420 and a corresponding texture frame 422 of FIG. 4B) can be similar for a single position of the 3D point cloud. As the 3D point cloud changes, new frames can be generated with different patches based on the new position the 3D point cloud. The frame 720 illustrates that the points within the cuboid 712a can be packed by the frame packing 418, of FIG. 4B, throughout the frame 720. As shown, the patches 722a, 722b, and 722c illustrate different patches of the 3D point cloud 710 from the cuboid 712a. As such, when a decoder decodes the frame, the entire frame 720 is decoded and used to reconstruct the point cloud even if only a portion of the point cloud is needed to be rendered on a display.

In certain embodiments, an encoder (such as the encoder 410), determines a number of motion constrain tiles to include in a 2D frame. For example, the encoder can determine that one cuboid (such as cuboid 712a) corresponds to a single motion constrain tile. In another example, the encoder can determine that multiple cuboids corresponds to a single motion constrain tile. Thereafter, a decoder (such as the decoder 450), can decode only certain motion constrained tiles that include the points of the 3D point cloud corresponding to one or more cuboids, based on the correspondence information.

Although FIGS. 7A, 7B, and 7C illustrate example point clouds and 2D frames representing a point cloud various changes can be made to the FIGS. 7A, 7B, and 7C. For example, while the 3D point cloud 710 represent a single object, in other embodiments, a point cloud can represent multiple objects, scenery (such as a landscape), AR content (such as text), and the like. In another example, the patches included in the 2D frame 720 can represent other attributes or textures such as geometry, luminance, reflectiveness, material, and the like. FIGS. 7A, 7B, and 7C do not limit this disclosure to any particular 3D object(s) and 2D frames representing the 3D object(s).

Figure 8:
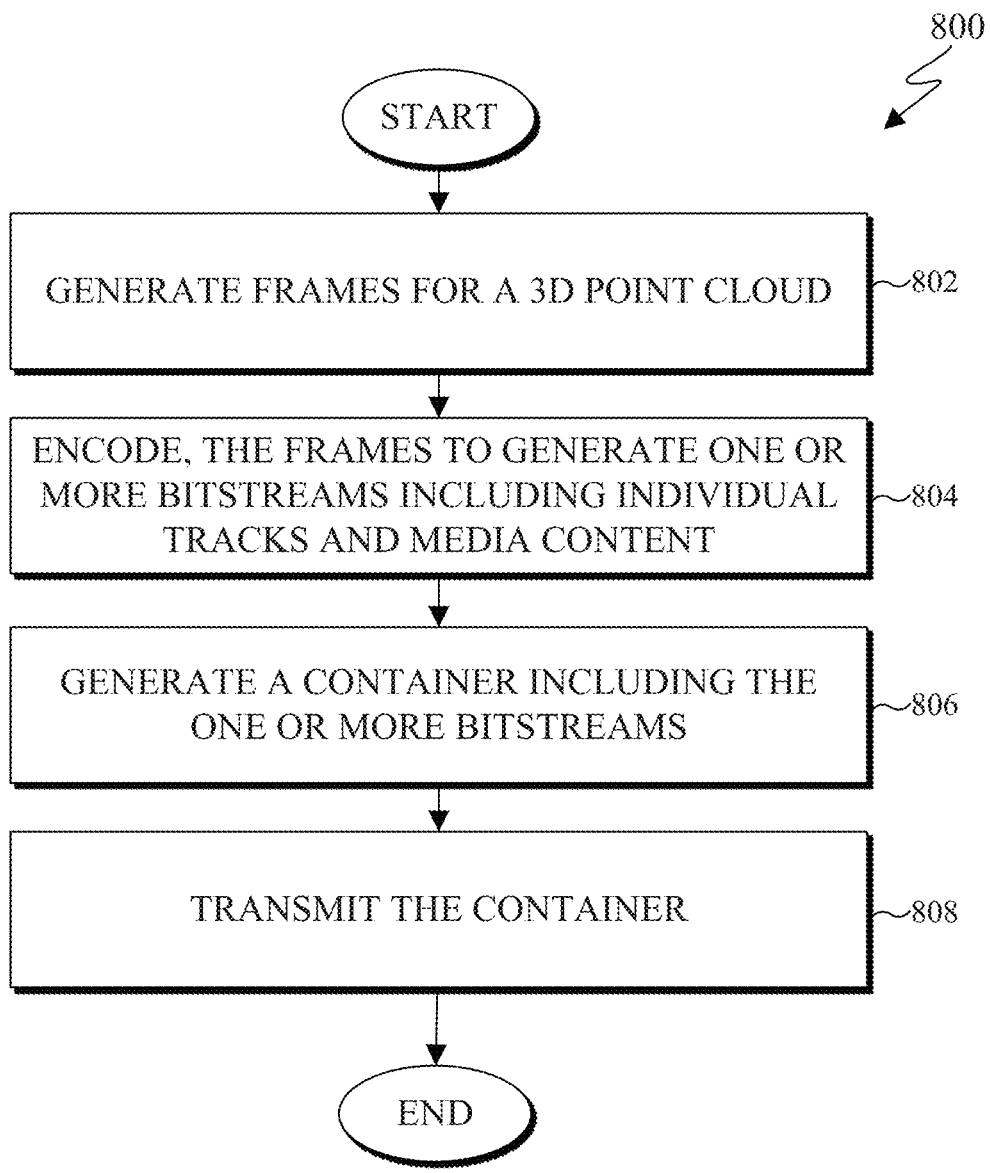
FIG. 8 illustrates an example flowchart for encoding a point cloud in accordance with an embodiment of this disclosure.

FIG. 8 illustrates an example method 800 for encoding a point cloud in accordance with an embodiment of this disclosure. The method 800 can be performed by the server 104 or any of the client devices 106-116 of FIG. 1, the server 200 of FIG. 2, the electronic device 300 of FIG. 3, the encoder 410 of FIGS. 4A and 4B, 4 or any other suitable device or system. For ease of explanation, the method 800 is described as being performed by the encoder 410 of FIGS. 4A and 4B.

In step 802, the encoder 410 generates 2D frames for a 3D point cloud. (802). The at least two 2D frames represent different attributes, respectively, of the 3D point cloud. For example, two or more frames can represent the same attribute while other frames represent a different attribute. In certain embodiments, some frames represent geometry while other frames represent color of the 3D point cloud. The encoder 410 also generates an occupancy map. The occupancy map indicates valid locations of pixels within a 2D frame.

In step 804 the encoder 410 performs the encoding of the 2D frames. For example, the encoder 410 encodes 2D frames to generate one or more bitstreams. The bitstreams include individual tracks and media content. The individual tracks include a timed metadata track and media tracks. The media tracks correspond to attributes of the 3D point cloud.

The timed metadata track references the media tracks, such that each media track uses metdata from the timed metadata track. The timed metadata track can include to the occupancy map, correspondence information, missed points patches, offset information (of the patches within the 2D frames), and the like.

In step 806, the encoder 410 generates a container and then transmits the container. The container can include the one or more bitstreams. The bitstream can be organized into two portions. A first portion that includes the individual tracks and the timed metadata track, and a second portion that includes the media content.

In certain embodiments, the encoder can segment the 3D point cloud and generate correspondence information relating each point to a particular cuboid. For example, the correspondence information associates a subset of the patches to a respective cuboid, respectively. In certain embodiments, the encoder 410 can generate both LoD and HoD resolution for each cuboid. In certain embodiments, the encoder 410 can encode patches with respect to various motion contained tiles based on the cuboid that the patches are associated with. For example, the encoder 410 can generate a motion constrained tiles and include patches from a particular cuboid in each of the motion constrained tiles.

In step 806, the bitstream can be ultimately transmitted to a decoder, such as the decoder 550.

Although FIG. 8 illustrates one example of a method 800 for point cloud encoding, various changes may be made to FIG. 8. For example, while shown as a series of steps, various steps in FIG. 8 could overlap, occur in parallel, or occur any number of times.

Figure 9:
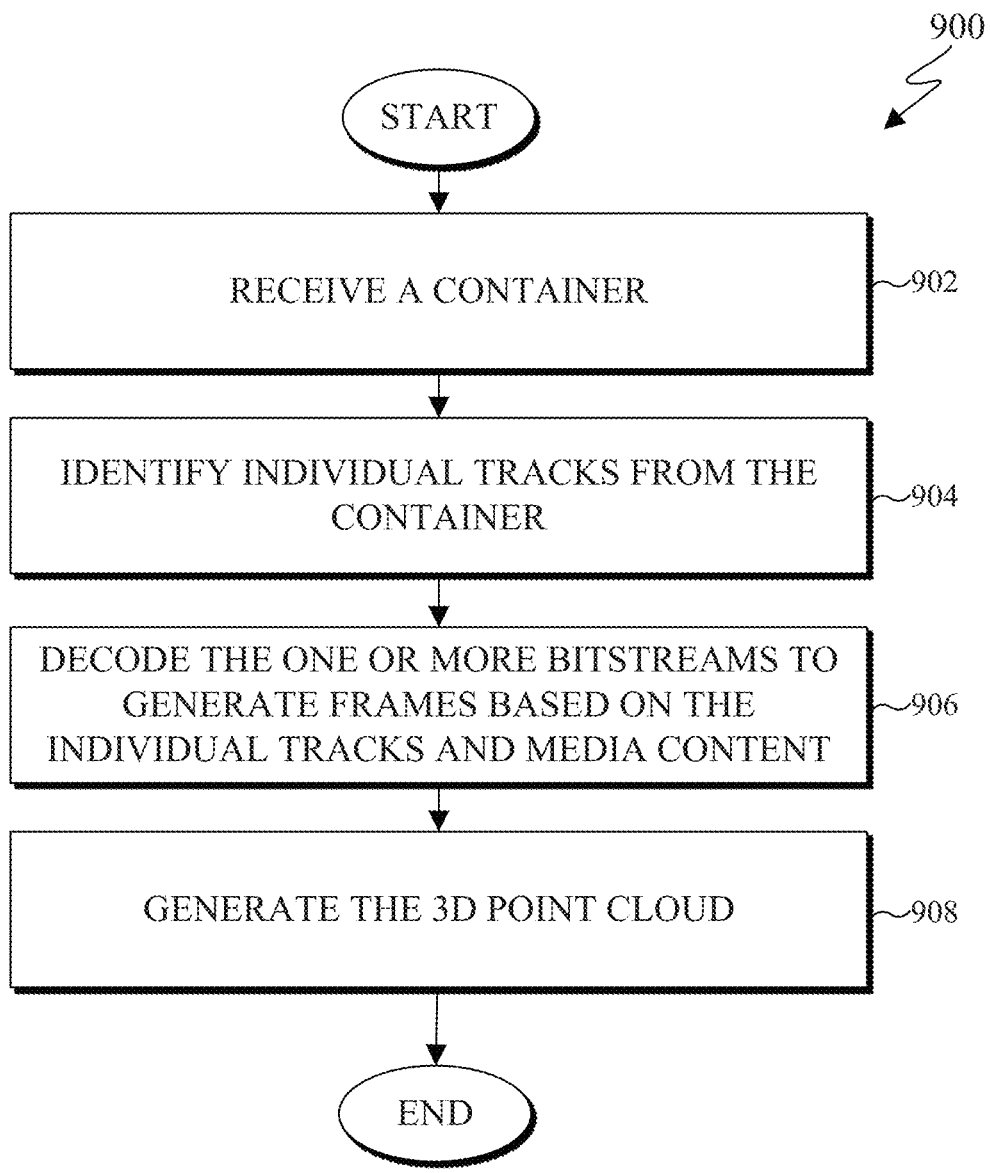
FIG. 9 illustrates an example flowchart for decoding a point cloud in accordance with an embodiment of this disclosure.

FIG. 9 illustrates an example method 900 for decoding a point cloud in accordance with an embodiment of this disclosure. The method 900 can be performed by the server 104 or any of the client devices 106-116 of FIG. 1, the server 200 of FIG. 2, the electronic device 300 of FIG. 3, the decoder 450 of FIGS. 4A and 4C, or any other suitable device or system. For ease of explanation, the method 900 is described as being performed by the decoder 450 of FIGS. 4A and 4C.

In step 902, the process begins with the decoder, such as decoder 550, receiving a container. The container can include an one or more bitstreams that represent a 3D point cloud that was mapped onto multiple 2D frames.

In step 904, the decoder identifies individual tracks from the multiple bitstreams. The individual tracks include a timed metadata track and media track. The timed metadata track references the media tracks. The timed metadata track can indicate the location of the occupancy maps, the missed patches, and the correspondence information within the media content. The decoder 450 can identify the correspondence information from the individual tracks, such as the timed metadata track. The media tracks correspond to attributes of the 3D point cloud.

In step 906, the decoder decodes the one or more bitstreams to generate frames based on the individual tracks and the media content. The frames correspond to attributes of the 3D point cloud. In certain embodiments, the decoder 450 can receive correspondence information prior to decoding the bitstreams. The correspondence information can indicate certain subsets to decode. For example, based on the FOV of the user, the decoder 450 can decode certain subsets. In certain embodiments, the correspondence information can relate to one or more subsets that space the 3D point cloud. For example, a point that is within one subset will not be within another subset. The subsets can correspond respectively to 3D spatial regions such as a cuboid. In certain embodiments, the pixels that are included in a frame and associated with one or more subsets, can be identified in one or more motion constrained tiles. In step 908, the decoder 550 generates, using the 2D frames and the timed metadata track, the 3D point cloud.

Although FIG. 9 illustrates one example of a method 900 for point cloud encoding, various changes may be made to FIG. 9. For example, while shown as a series of steps, various steps in FIG. 9 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, comprising:
   a communication interface configured to receive a container including one or more bitstreams; and
   a processor operably coupled to the communication interface, wherein the processor is configured to:
      identify, from the container, individual tracks including a timed metadata track and media tracks, wherein the timed metadata track references the media tracks and the media tracks correspond respectively to attributes of a three-dimensional (3D) point cloud,
      decode the one or more bitstreams to generate frames based on the individual tracks and media content, wherein the frames correspond to the attributes and an occupancy map, and
      generate the 3D point cloud using the frames and the timed metadata track.

2. The decoding device of claim 1, wherein:
   the processor is configured to identify a point cloud compression header in a sample entry of the timed metadata track, and
   the timed metadata track indicates a location of at least one of the occupancy map or an auxiliary patch within the media content.

3. The decoding device of claim 1, wherein the processor is further configured to:
   identify correspondence information associated with the individual tracks, determine that the 3D point cloud is segmented into multiple subsets,
wherein the correspondence information associates points of the 3D point cloud to pixels included in the of frames.

4. The decoding device of claim 3, wherein:
the pixels included in the frames include a first subset and a second subset, the first subset representing a higher level of detail than the second subset,
the communication interface is configured to receive the correspondence information prior to receiving the container
the processor is further configured to:
 decode the first subset and the second subset, based on the correspondence information, and
 generate the 3D point cloud using the frames and the timed metadata track corresponding to the first subset and the second subset.

5. The decoding device of claim 3, wherein:
the multiple subsets span the 3D point cloud,
a point, of the 3D point cloud, that is within a first subset, of the multiple subsets, is not within another subset of the multiple subsets, and
the multiple subsets correspond respectively to multiple 3D spatial regions.

6. The decoding device of claim 5, wherein the multiple 3D spatial regions are cuboids.

7. The decoding device of claim 5, wherein the pixels included in the frames are motion constrained tiles.

8. An encoding device for point cloud encoding, comprising:
a processor configured to:
 generate, for a three-dimensional (3D) point cloud, frames corresponding to attributes of the 3D point cloud and an occupancy map;
 encode, the frames to generate one or more bitstreams including individual tracks and media content, the individual tracks include media tracks and a timed metadata track, wherein the timed metadata track references the media tracks and the media tracks correspond respectively to the attributes;
 generate a container including the one or more bitstreams; and
a communication interface operably coupled to the processor, the communication interface configured to transmit the container.

9. The encoding device of claim 8, wherein:
the processor is configured to place a point cloud compression header in a sample entry of the timed metadata track, and
the timed metadata track indicates a location of at least one of the occupancy map or an auxiliary patch within the media content.

10. The encoding device of claim 8, wherein the processor is configured to:
segment the 3D point cloud into multiple subsets;
generate correspondence information associating points of the 3D point cloud to pixels included in the frames; and
include the correspondence information in the individual tracks.

11. The encoding device of claim 10, wherein:
the pixels included in the frames include a first subset and a second subset, the first subset representing a higher level of detail than the second subset, and
the communication interface is configured to transmit the correspondence information, associated with the first subset and the second subset, prior to transmitting the container.

12. The encoding device of claim 10, wherein:
the multiple subsets span the 3D point cloud,
a point, of the 3D point cloud, that is within a first subset, of the multiple subsets, is not within another subset of the multiple subsets, and
the multiple subsets correspond respectively to multiple 3D spatial regions.

13. The encoding device of claim 12 wherein the multiple 3D spatial regions are cuboids.

14. The encoding device of claim 12, wherein the pixels included in the frames are motion constrained tiles.

15. A method for point cloud encoding, comprising:
generating, for a three-dimensional (3D) point cloud, frames corresponding to attributes of the 3D point cloud and an occupancy map;
encoding, the frames to generate one or more bitstreams including individual tracks and media content, the individual tracks include media tracks and a timed metadata track, wherein the timed metadata track references the media tracks and the media tracks correspond respectively to the attributes;
generating a container including the one or more bitstreams; and
transmitting the container.

16. The method of claim 15, further comprising:
placing a point cloud compression header in a sample entry of the timed metadata track, and
wherein the timed metadata track indicates a location of at least one of the occupancy map or an auxiliary patch within the media content.

17. The method of claim 15, further comprising:
segmenting the 3D point cloud into multiple subsets;
generating correspondence information associating points of the 3D point cloud to pixels included in the frames; and
including the correspondence information in the individual tracks.

18. The method of claim 17, wherein:
the pixels included in the frames include a first subset and a second subset, the first subset representing a higher level of detail than the second subset, and
the method further comprises transmitting the correspondence information, associated with the first subset and the second subset, prior to transmitting the container.

19. The method of claim 17, wherein:
the multiple subsets span the 3D point cloud,
a point, of the 3D point cloud, that is within a first subset, of the multiple subsets, is not within another subset of the multiple subsets, and
the multiple subsets correspond respectively to multiple 3D spatial regions.

20. The method of claim 19, wherein:
the multiple 3D spatial regions are cuboids, and
the pixels included in the frames are motion constrained tiles.

* * * * *